C. L. NELSON.
CALCULATING MACHINE.
APPLICATION FILED OCT. 21, 1908.
933,486.
Patented Sept. 7, 1909.
5 SHEETS—SHEET 1.
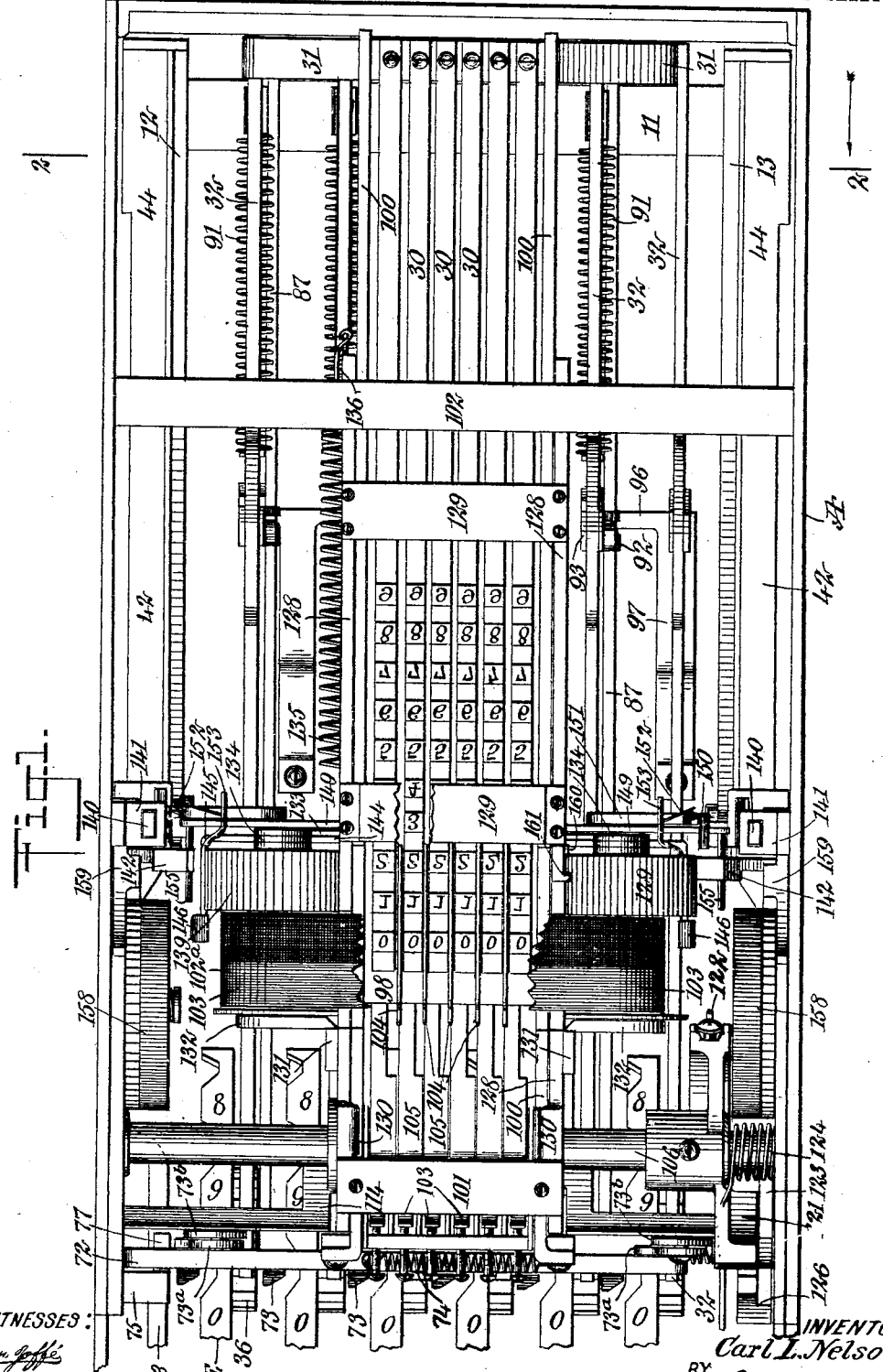
WITNESSES:
INVENTOR
Carl L. Nelson
BY
ATTORNEYS

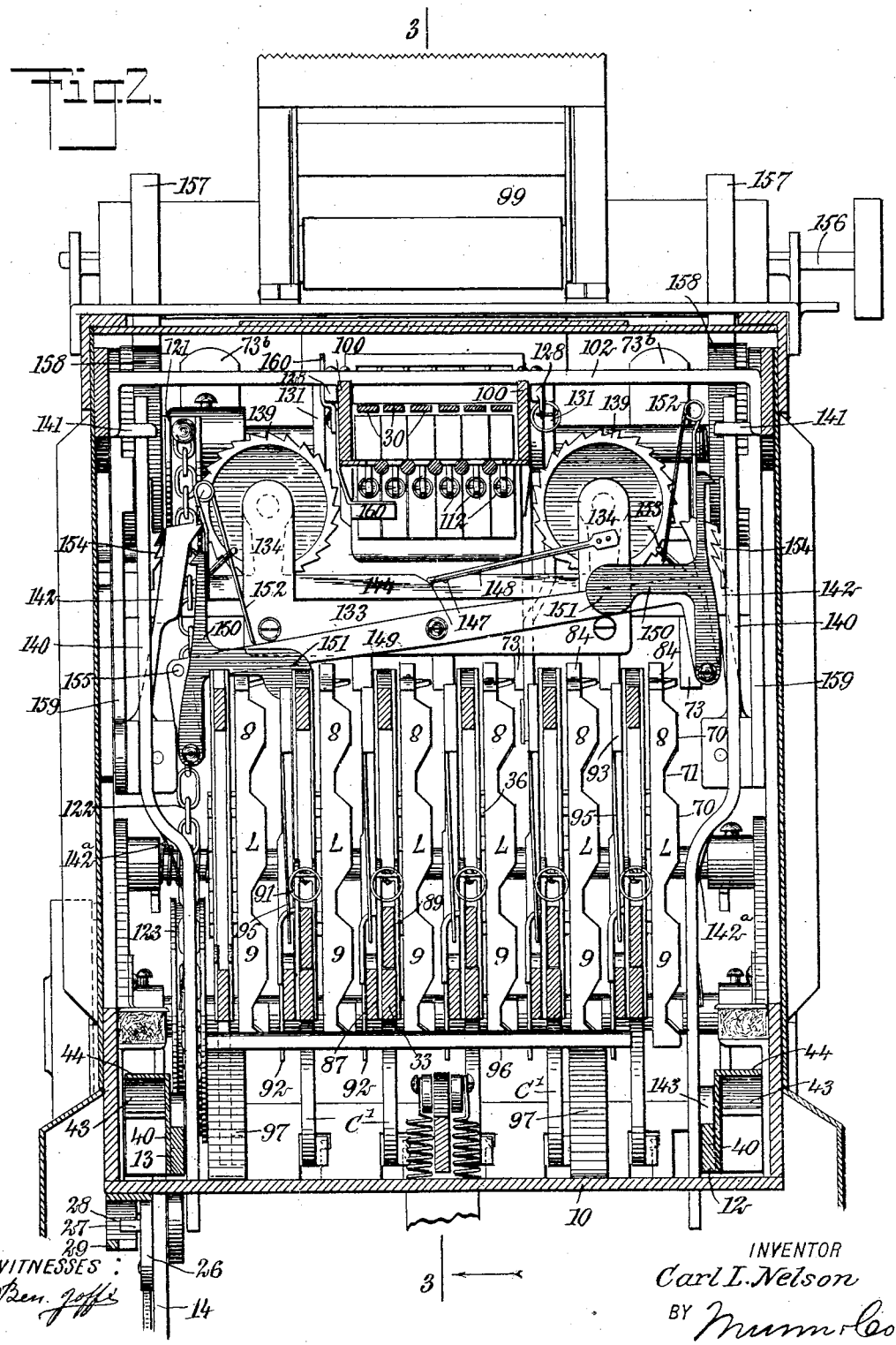

C. L. NELSON.
CALCULATING MACHINE.
APPLICATION FILED OCT. 21, 1908.
933,486.
Patented Sept. 7, 1909.
5 SHEETS—SHEET 3.
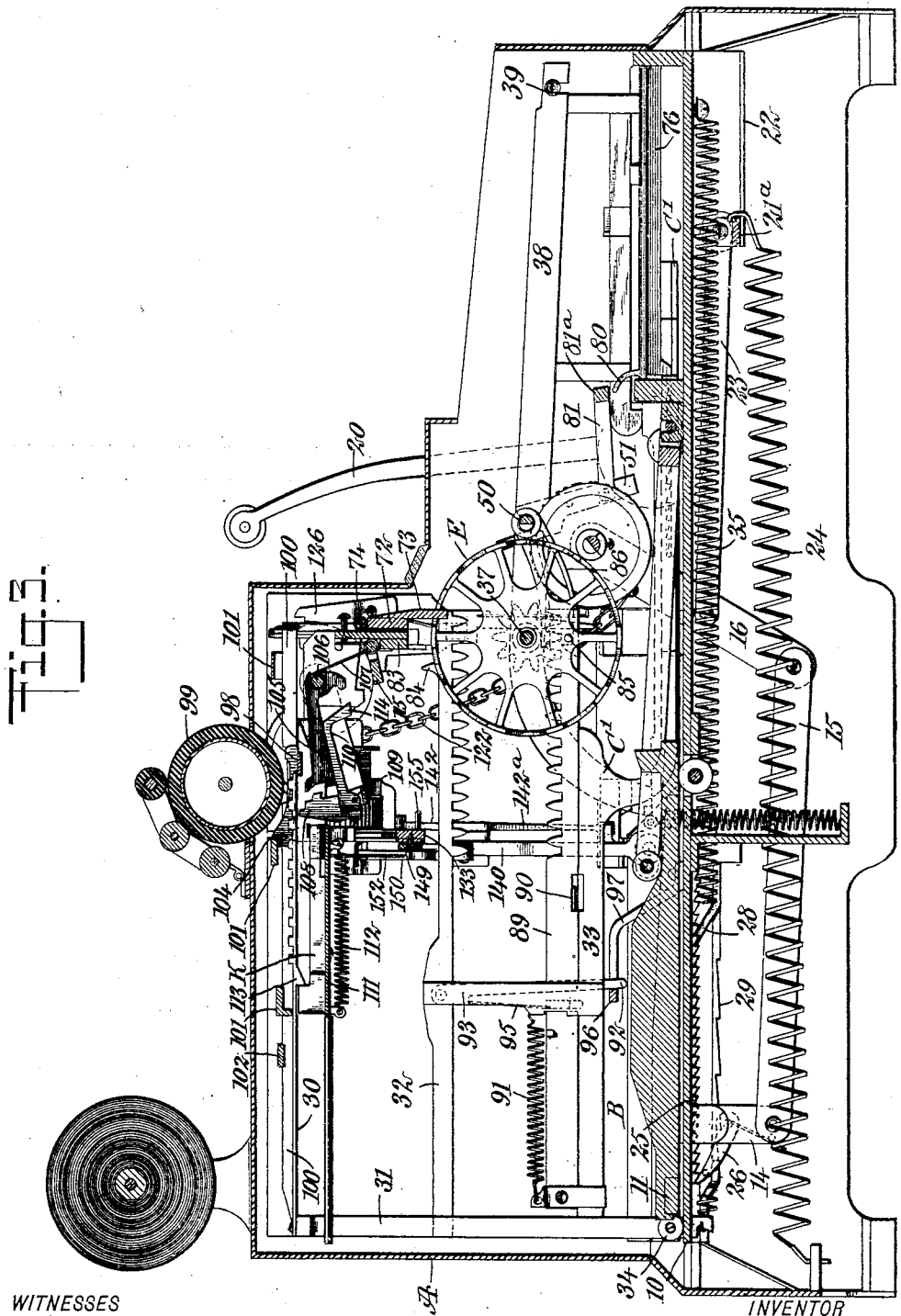
WITNESSES
INVENTOR
Carl L. Nelson
BY
ATTORNEYS C. L. NELSON.
CALCULATING MACHINE.
APPLICATION FILED OCT. 21, 1908.
933,486.
Patented Sept. 7, 1909.
5 SHEETS—SHEET 4.
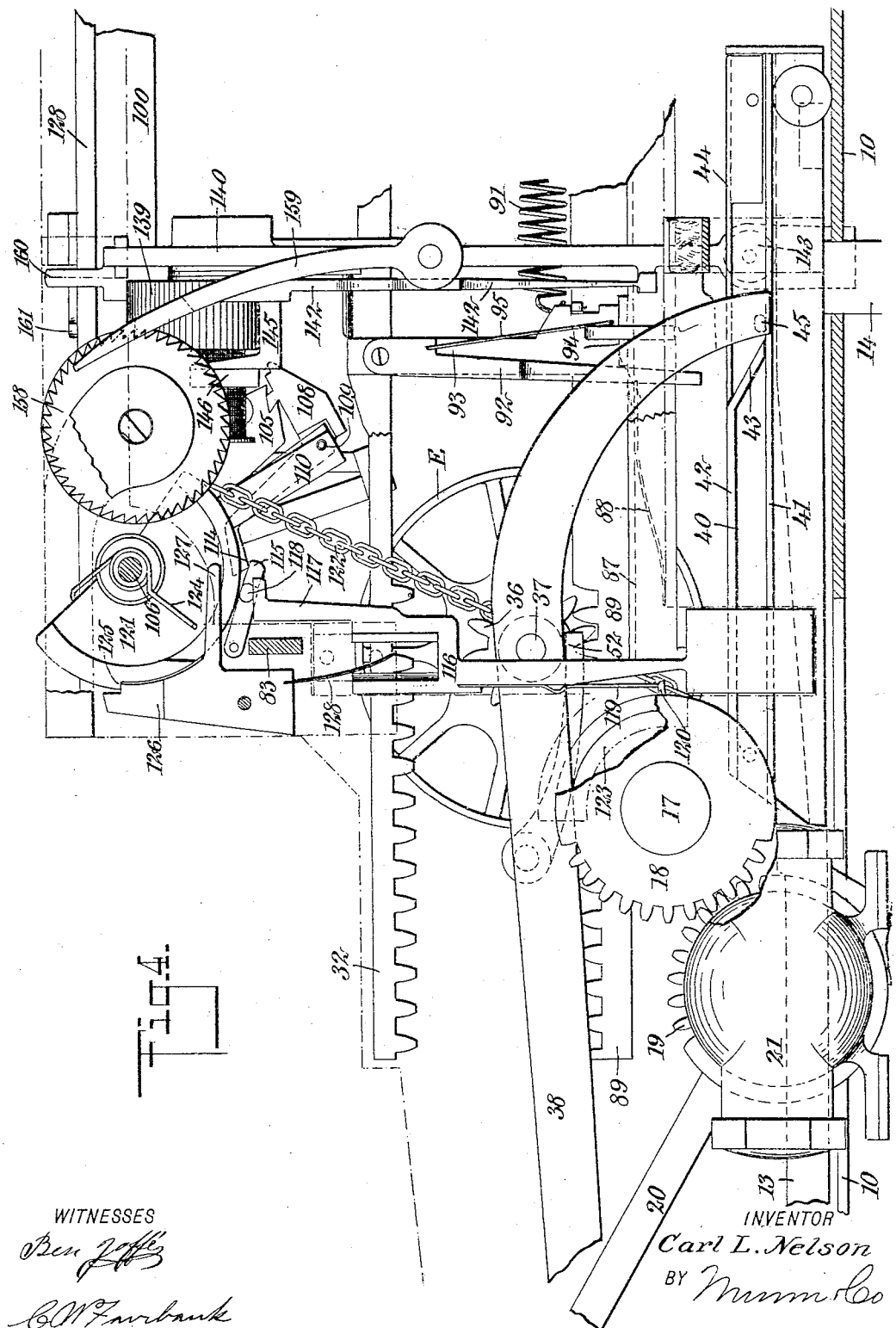
WITNESSES
Ben Jaffe
C. W. Fairbank
INVENTOR
Carl L. Nelson
BY Munn & Co
ATTORNEYS C. L. NELSON.
CALCULATING MACHINE.
APPLICATION FILED OCT. 21, 1908.
933,486.
Patented Sept. 7, 1909.
5 SHEETS—SHEET 5.
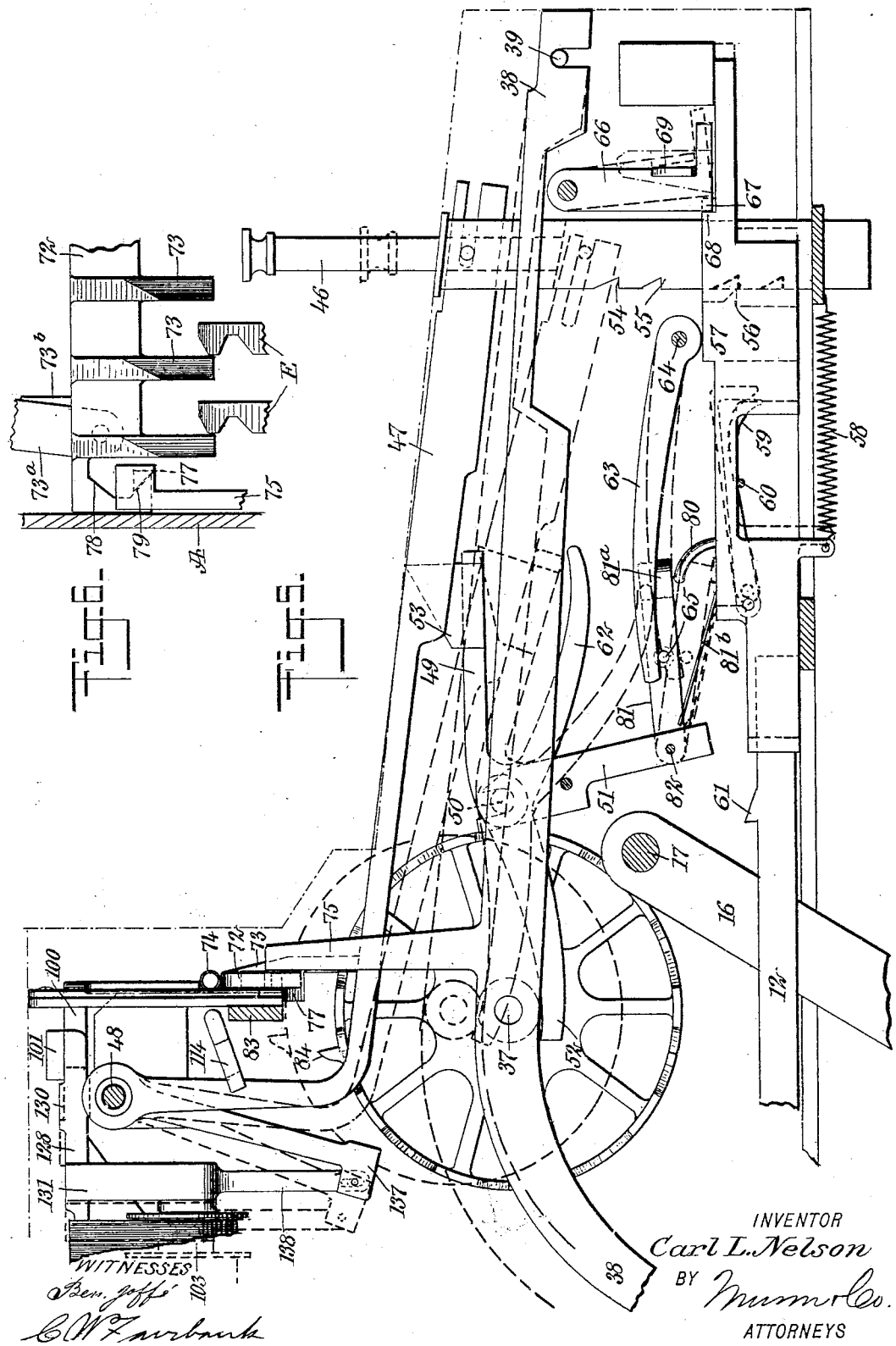
INVENTOR
Carl L. Nelson
BY Munn & Co.
ATTORNEYS

UNITED STATES PATENT OFFICE.

CARL L. NELSON, OF SEATTLE, WASHINGTON.

CALCULATING-MACHINE.

933,486.  Specification of Letters Patent.  Patented Sept. 7, 1909.

Application filed October 21, 1908. Serial No. 458,747.

*To all whom it may concern:*

Be it known that I, CARL L. NELSON, a citizen of the United States, and a resident of Seattle, in the county of King and State of Washington, have invented a new and Improved Calculating-Machine, of which the following is a full, clear, and exact description.

This invention relates to certain improvements in calculating machines of that type in which the keys are operated in accordance with the number to be listed, and more particularly to that type of machine disclosed in my previous patent Number 897,768, granted September 1, 1908, although it is evident that various features of my present invention might be employed in other calculating machines than that shown in said patent.

The object of my invention is to simplify certain features of the mechanism shown in the patent referred to, and to render the operation of certain of the parts more positive and less liable to accidental derangement.

One particular feature of the present invention resides in the printing mechanism, whereby the numbers are printed during the return movement of the carriage rather than during the forward movement as in my previous construction.

A further improvement resides in the ribbon-operating and shifting mechanism.

A further improvement resides in the operating mechanism whereby the handle is first drawn forwardly and released, the return movement being automatically effected.

A further improvement resides in the means for controlling the movement of the indicating dial during the listing of a number and during the printing of a total.

Further features of importance will be pointed out hereinafter in the detail description of the mechanism.

I have not illustrated a full and complete working machine, inasmuch as my previous patent shows such a machine and all of the parts not shown in the accompanying drawings are clearly shown in said patent, and the parts of the mechanism including my present invention are adapted to coöperate therewith.

Reference is to be had to the accompanying drawings, forming a part of this specification, in which similar characters of reference indicate corresponding parts in all the figures.

Figure 1 is a top plan view of the rear portion of my mechanism, the casing being removed and the figure corresponding to a portion of Fig. 2 of said patent; Fig. 2 is a transverse section on the line 2—2 of Fig. 1; Fig. 3 is a longitudinal section of the entire machine on a smaller scale and taken on the line 3—3 of Fig. 2; Fig. 4 is a side elevation of a portion of the mechanism, the parts being illustrated in the position they occupy at the end of the forward stroke of the operating handle and the view being taken in the opposite direction to that shown in Fig. 3; Fig. 5 is a side elevation of the controlling mechanism for effecting the printing of the totals, the casing being removed and the view taken in the same direction as Fig. 3; and Fig. 6 is a front view of the numeral wheel locking mechanism.

Most of the features of my present construction operate upon substantially the same principle as those of the construction shown in the before mentioned patent. I employ substantially the same outside casing A, having operating keys at the front end thereof and serving to control the forward movement of dial-rotating and type-moving mechanisms. In the lower portion of the casing and above the bottom 10, I mount a carriage B, serving to operate various portions of the mechanism. This carriage includes a transversely-extending rear member 11, above the bottom of the machine and connected at its opposite ends to forwardly-extending longitudinally-movable side members 12 and 13. Extending downwardly from each of these side members and adjacent their rear ends are two brackets 14, to the lower ends of which is connected the mechanism for operating the carriage in one direction. This operating mechanism includes links 15, extending rearwardly from depending arms 16, which latter are rigidly connected to the main shaft 17 of the machine. Instead of connecting the operating crank directly to this main shaft 17, I provide the latter with a gear wheel 18, having teeth along a portion of its periphery and intermeshing with the teeth on a second gear wheel 19, which is mounted on a stub shaft and carries an operating handle 20. Thus, the gear wheels 18 and 19 rotate in opposite directions, and in order to move the carriage forwardly, the handle itself is brought forwardly rather than rearwardly. The gear wheel 18 may have connected thereto any suitable form of check mechanism 21, including dash pots, so as to limit the speed of the forward and backward movements of the handle. The details of this double check or double dash pot mechanism involve no feature of my invention and have not been illustrated, but the use of such a mechanism at this particular place is highly important, as it prevents injury or displacement of the parts by too rapid operation thereof, and permits the carriage to be slowly returned by the action of springs about to be described Beneath the floor or bottom 10 of the machine and at the front end thereof, I employ a transversely-extending bar 21ª, having its ends supported in suitable guides 22 and connected adjacent its ends to the depending arms 16 by means of links 23. The bar 21ª is connected to the rear end of the casing of the machine by one or more heavy coil springs 24, so that as the carriage is brought forwardly by the handle 20, the bar 21ª will also be brought forwardly but at a slower rate and the tension of the springs will be increased. As soon as the handle is liberated at the end of its stroke, the spring 24 slowly draws the carriage rearwardly to its initial position.

In order to insure the forward movement of the handle to the end of its stroke before the return movement begins, and in order to insure the complete return movement of the bar before the next succeeding forward movement begins, I provide the ratchet mechanism illustrated particularly in Figs. 2 and 3. The under side of the casing carries rigid therewith a ratchet bar 25, having forwardly-facing teeth and the depending bracket 14 of the side member 13 of the carriage carries a pawl 26, pressed upwardly into engagement with said teeth by a suitable spring. The pawl carries on one side thereof an outwardly-extending pin or projection 27, which when the carriage reaches the forward end of its stroke, engages with a cam 28 and passes below and beyond the end of a second ratchet bar 29. This brings the end of the pawl 26 out of engagement with the ratchet bar 25, so that the carriage may now return, but as the return movement begins, the pin 27 passes on to the lower side of the ratchet bar 29 and the pawl is held out of engagement with the ratchet bar 25 during the return movement. The teeth of the ratchet bar 29 face rearwardly, so that should the operator attempt to start the carriage forwardly after it has completed only a portion of the return movement, this forward movement will be prevented by the engagement of the pin with the teeth of the ratchet bar 29. When the carriage reaches its limiting rearward position, the pin passes to the upper side of the ratchet bar 29 and the pawl returns into engagement with the ratchet bar 25.

The movement of the carriage serves to permit the forward movement of the type bars and numeral wheel rotating racks, and it also operates to hold the pinions of the numeral wheels out of engagement with other racks during the movement of the latter in one direction and operates the feeding mechanism of the printing ribbon. The type-carrying means and the numeral wheel rotating means operate upon the same principle as the corresponding parts shown in Fig. 10 of my previous patent. Near the top of the casing are the forwardly-extending type bars proper 30, each supported at its rear end upon an upwardly-extending standard 31, which latter is connected to two forwardly-extending and oppositely-disposed rack-carrying bars 32 and 33. The lower end of each standard extends through a slot in the floor 10 and on its side adjacent the upper surface of the floor carries a roller 34, to facilitate the forward movement of the standard and the forwardly-extending members 30, 32 and 33. The lower ends of the standards come at the rear side of the transverse member 11 of the carriage, so that the rearward movement of the carriage causes a rearward movement of the standards and their attached parts. For moving the standards forwardly, the lower end of each is connected by a coil spring 35 to the under side of the bottom of the casing adjacent the front end thereof, so that upon the depressing of the numeral keys and the forward movement of the carriage, the standards, type bars and racks, are also brought forward and to an extent determined by the particular numeral keys depressed. I control the forward movement of the type bars by key mechanism not shown, but identical in all respects with that illustrated in Figs. 14 and 15 of my previous patent, and this key mechanism engages with forwardly-extending fingers C', integral with or rigidly secured to the lower rack bar 33. The fingers C' are notched and their forward movements are directly-controlled by stop leaves, each hinged at its upper edge and each having a downwardly-extending projection 76. The depression of the keys, not shown, moves these stop leaves varying amounts, to limit and control the forward movement of the fingers C', the rack-carrying bars 32 and 33, the standards 31, and the type-carrying bars 30. As in my previous construction, there are provided a plurality of numeral wheels E, each carrying a pinion 36, spaced intermediate the two rack-carrying bars 32 and 33. During the normal movement of the carriage in listing and adding, these numeral wheels and their pinions are alternately raised and lowered, so that the numerals are in alinement with the lower racks during the movement of the latter in one direction, and are out of engagement with either rack during the movement in the opposite direction.

One important feature of my present invention relates to the means for raising and lowering the numeral wheels and their pinions. All of the numeral wheels and pinions are mounted on a transversely-extending shaft 37, which latter is journaled at its ends in two arms 38, disposed adjacent the sides of the casing. Each of these arms is pivoted adjacent its front end upon a stud or screw 39, carried by the casing wall, and the shaft 37 comes intermediate the ends of the arms. The rear ends of the arms rest in engagement with a portion of the carriage provided with suitable camways for raising and lowering said arms and the numeral wheels and pinions carried thereby. Each of the two side members 12 and 13 of the carriage has an upwardly-extending side plate 40 secured to its outer side, and an outwardly-extending plate or flange 41 extending horizontally and lengthwise of the side member. At the front end of the side plate 40, there is pivoted thereto a camway or track 42, having an upper surface substantially parallel to the plate 41 and having said surface at the rear end, inclined downwardly to form a cam 43. The plate 40 also carries a second horizontal plate 44 pivoted thereto adjacent the rear end, and having its front end resting upon the plate 42 adjacent the upper end of the cam 43. The corresponding numeral wheel carrying arm 38 is provided with a laterally-projecting stud or pin 45, adapted to rest on the plates 41 and 42 as the carriage is moved longitudinally. With the parts in the position indicated in Fig. 4, the carriage is at the front end of its stroke, and as it begins the rearward movement, the stud or projection 45 travels up the cam 43 and lifts the end of the plate 44. This upward movement raises the arms 38 and the pinions 36, so that the latter no longer engage with the lower rack bars and the latter may return to their original position without rotating said wheel. As the carriage reaches the rear end of its stroke, the stud or projection 45 reaches the forward end of the plate 42 and drops off on to the plate 41, thus returning the pinions into engagement with the lower racks. Now, when the carriage is brought forwardly after the listing of another number on the numeral keys, the stud travels on the plate 41 and the pinions are rotated by the racks to an extent dependent upon the number listed.

Another feature of my present improvement involves the mechanism for raising the pinions 36 into engagement with the upper racks when it is desired to print a total. This also operates to shift the ribbon, so that the total may be printed in ink of a different color, and it also operates to liberate all of the fingers C', so that their forward movement may be unrestricted and it stops each numeral wheel when it has rotated to the zero position. This mechanism is shown particularly in Fig. 5, and involves a depressible key 46, having slot-and-pin connections with a lever 47. This lever is rigidly secured to a shaft 48 at its rear end, and is disposed directly above the end of a lever 49 rigidly secured to a shaft 50, extending across the machine adjacent the front of the row of numeral wheels. The ends of the shaft 50 are mounted in the upper ends of bars 51, rigidly secured to the sides of the casing, and the shaft at each end thereof carries a rearwardly-extending lever 52, the free end of which lies directly below and closely adjacent to the shaft 37 of the numeral wheels and pinions. The lever 49 at its free end, if desired, may carry an upwardly-extending guide plate 53, to insure the proper engagement of the lever 47 with the lever 49. As the key 46 is depressed, the levers 47, 45 and 52 operate to raise the shaft 37 and the pinions 36, so that the latter will come into engagement with the upper racks, during the forward movement of the latter. This upward movement of the shaft 37 and the arms 38 is permitted at the rear ends of the latter by reason of the fact that the studs or projections 45 merely rest upon the plates 41, and they may be readily raised out of engagement therewith and lift the plates 44 to the necessary angle. The key 46 may also be used for raising the numeral wheels to an intermediate position, so that the reciprocation of the racks in either direction will not affect the numeral wheels, and thus numbers may be listed without being added.

For holding the key 46 in its intermediate and non-printing position, or in its lowermost and total-printing position, said key is provided with two notches 54 and 55, each of which may engage with a projection 56 on a plate 57 movable longitudinally of the casing. The plate is normally held in its forward position by the action of a coil spring 58, and the notches 54 and 55 are normally above the projection. Upon depressing the key to either the intermediate or the lowermost position, it becomes automatically locked by the entry of the projection within the corresponding notch or recess. For liberating the key and permitting its return after the printing of a number, the plate 57 is provided with a catch 59 pivoted at one end and normally resting on a stationary wall of the casing. The side member 12 of the carriage carries a projection 61, which, when the carriage is in its forward limiting position, comes past the end of the catch 59. Upon the return movement of the carriage, the projection 61 engages with the catch 59 and moves the plate 57 toward the rear end of the machine and against the action of the spring 58. The under side of the catch 59 is inclined, so that after the plate and the catch have moved rearwardly a short distance, the catch by its engagement with the stationary pin 60, is raised upwardly and out of the path of the projection 61, so that the carriage may continue its rearward movement, but the plate 57 may be returned to its forward position by the spring 58. This short rearward movement of the plate 57 brings the projection 56 out of the notch in the key 46, and the latter is permitted to rise by the action of gravity on the arms 38, the numeral wheels and the attached parts.

During the printing of a total, it is necessary that the numeral wheels and the racks in engagement therewith be free to move forwardly until all of the numeral wheels come to the zero position, and it is therefore necessary that the stop leaves 76 be depressed at this time. Each stop leaf 76 carries an upwardly and rearwardly-extending curved finger 80, the free end of which lies beneath a transverse bar 81$^a$, which latter is secured at its ends to arms 81, pivoted by pins 82 to the lower ends of the stationary bars 51. The arms 81 are normally held in raised position by suitable springs 81$^b$. This construction is substantially the same as that shown in my previous patent.

For depressing the bar 81$^a$ upon the depression of the total key 46, I provide the lever 49 with a branch 62 disposed below the same, and this branch when in its lowermost position engages with a bar 63 mounted on a pivot 64 carried by the frame of the machine and having its free end resting upon a pin 65 carried by the above-mentioned arm 81. The pin 65 is intermediate the ends of the arm, and the branch 62 engages with the bar 63 intermediate the pivot of the latter and the point of engagement between said bar and the pin 65, so that as the key 46 is depressed, it operates through the parts 47, 49, 62, 63, 65, 81, 81$^a$ and 80, to depress the stop leaves 76 and lock them in depressed position during the printing of a total. The end of the branch 62 is spaced a sufficient distance above the bar 63, so that it does not come into engagement therewith to depress the latter, if the key 46 be depressed only to its first position, that is, with the projection 56 entering into the notch 55. Thus, during the listing of a number which is not to be added, the stop leaves which control the branch are unaffected, but if the key 46 be depressed to its lowest position, the stop leaves are thrown out of operation. In case the key 46 has been unintentionally depressed, or in case it is desired to release it without operating the machine, I provide a depending lever 66 pivoted at its upper end to a stationary pin carried by the casing of the machine, and having its lower end terminating in a shoulder 67 engaging with a corresponding shoulder 68 on the plate 57. The lever 66 has a lug 69, which extends out through an opening in the side of the casing, so that by pressing on said lug, the lever 66 and the plate 57 may be pressed rearwardly to bring the projection 56 out of engagement with the key 46 and permit the latter to rise.

The raising of the numeral wheels serves not only to control the engagement of the pinions with the rack bars, but it also serves to control the rotation of the wheels by locking them against turning while in the intermediate position and while the pinions are out of engagement with both sets of racks. Each numeral wheel is provided with laterally-extending portions 70, separated by notches or recesses 71. Extending across the machine above the numeral wheels is a longitudinally-movable plate 72, having a series of depending fingers 73 rigid therewith and adapted to enter the recesses 71 of the wheels upon the longitudinal movement of the plate transversely of the machine. The plate is supported by links 73$^a$, each having its lower end connected to the plate adjacent the end of the latter, and each having its upper end connected to the upper end of an upwardly-extending stationary standard 73$^b$. The plate is provided with a spring 74, normally tending to draw the plate in one direction, so as to bring the fingers into the notches, but this longitudinal movement is normally resisted by an upwardly-extending arm 75 carried by or integral with one of the arms 38 (see Fig. 5), and this arm 75 at its upper end is provided with a laterally-extending projection 77 engaging with a cam recess in the end of the plate 72. The recess has an upper cam portion 78 and a lower cam portion 79, oppositely-disposed to each other and intersecting adjacent the end of the plate. With the arm 75 in its lowered position, it engages with the lower cam 79 and forces the plate 72 longitudinally and draws the fingers 73 out of the notches in the numeral wheels. When the numeral wheels are raised to their intermediate positions, the projection 77 comes intermediate the two cam portions and the plate moves lengthwise to lock the numeral wheels against rotation. When the numeral wheels are forced to their highest position, the projection engages with the upper cam to return the plate to its original position and again unlock the wheels.

With the wheels raised to their uppermost position by the depression of the key 46, it will be noted that all of the fingers C' of the rack bars may move forwardly and rotate the numeral wheels. When a total is to be printed, it is desirable to rotate each of the numeral wheels to the zero position and in the opposite direction to that taken by the wheel in accumulating a total, so that the number of spaces through which the wheels travel in reaching the zero position is equal to the numbers shown by said wheels in forming the total. Thus, as each wheel rotates a distance dependent upon the number shown and the type bars are moved lengthwise by the rotation of the wheels, the number which will be printed will be the same as the total shown on the numeral wheels before the depression of the key 46. For stopping the wheels at zero, I provide a transverse plate 83, directly back of the plate 72 and provide each of the numeral wheels with a radially-disposed stud or projection 84, which, when the wheel is in its raised position, may come into engagement with the plate 83 constituting a stop. The studs 84 are so disposed on the numeral wheels that when said projections are adjacent the rear surface of the plate 83, the zeros on the several numeral wheels will be in alinement and exposed to view.

For effecting the carrying operation, that is, for rotating a wheel through one space after the wheel of next lower denomination has rotated through nine spaces, I provide mechanism very similar to that disclosed in my previous patent. Each numeral wheel carries a pin 85, which may engage with corresponding trip pawls 86 pivoted to the shaft 50. Each trip pawl is provided with a cam surface at the end over which the pin may ride to depress the pawl, while the numeral wheel rotates in one direction, and adjacent this cam surface is a catch which engages with the pin to prevent the rotation of the wheel past the zero position in the opposite direction. This stopping action is in addition to that normally effected by the engagement of the projections 84 on the numeral wheels with the plate 83. The lower end of each trip pawl rests upon a lever 87 pivoted to the lower rack-carrying bar 33, adjacent the rear end thereof and normally held in its raised position by a spring 88 beneath the same. The rack-carrying bar 33 is separate from the lower rack bar proper 89, although the latter is normally locked thereto.

The lever 87 is provided with a projection 90, which extends through a recess in the rack bar proper, when the lever is in its raised position, or may enter a recess in the bar 33 when the lever is in its lowered position. The rack bar proper carries a spring 91, which normally tends to force the rack bar forwardly, but this forward movement is normally prevented by the engagement of the projection 90 in the recess in said rack bar 89. When the numeral wheel has rotated through nine spaces, a further rotation of the wheel brings its pin 85 into engagement with the trip pawl 86 of the wheel of next higher denomination, and the depressing of this pawl depresses the lever 87 and moves the projection 90 out of the recess in the rack bar 89, whereupon the latter may move forwardly one space under the action of the spring 91.

To hold the lever 87 in its lowered position and the rack bar 89 in its forward position in respect to the bar 33 until after the parts have returned to their original position, I provide a locking lever 92, the upper end of which is pivoted to a vertical connecting bar 93, extending from the bar 32 to the bar 33. This locking lever has a shoulder extending adjacent the upper surface of the lever 87, and on the latter is an upwardly-extending lug 94. The lever 92 is normally drawn rearwardly into engagement with the side of the lug by a spring 95, so that as soon as the lever 87 is depressed, the locking lever 92 is drawn rearwardly over the lug 94 and holds the lever 87 in its lowered position. For bringing the locking lever out of engagement with the lug and permitting the return movement of the lever 87 after the parts have returned approximately to their original position, I provide a stationary transverse bar 96 supported from the bottom of the machine by brackets 97 adjacent the sides of the machine. This bar 96 is so positioned that when the carriage has forced the rack bars to their rearward position, the lower end of the locking lever 92 has come into engagement beyond the shoulder on the locking lever, so that the lever 87 may move upwardly under the action of the spring 88 and the projection 90 may enter the recess in the rack bar 89.

One of the most important features of my invention resides in the construction of the type bars 30. These bars are each formed of a narrow thin strip of resilient material and each is secured at its rear end to the upper end of the corresponding standard 31. At their front ends, they rest upon a stationary transverse bar 98 over which they slide as the carriage, racks and standards move forwardly. The transverse bar 98 is disposed below the platen 99 over which the paper passes but is in front of the point at which the hammers strike the under sides of the type bars during the printing action. All of the type bars are mounted in the same horizontal plane and lie between two stationary side bars 100, which latter are rigidly connected at their front ends to the transverse frame which supports the locking plate 72. The side bars 100 are also rigidly connected together by a transverse bar 101 and are connected to the frame adjacent their rear ends by a bar 102. Adjacent the hammers, the side bars 100 serve as supports for the ribbon 102$^a$, the ends of which are secured to two rollers 103, disposed at a slightly lower elevation and between the side bars 100 and the sides of the casing of the machine. The ribbon is supported intermediate the several type bars by forwardly-extending curved plates 104, rigidly secured to the ribbon carriage hereinafter referred to, and rests upon the transverse supporting bar 98. These bars hold the ribbon at a slightly higher elevation than the type, so that the latter may freely reciprocate, but when the hammers strike the under side of the type, the latter have but a very short distance to travel to engage with the ribbon and force the latter into engagement with the paper. The type are all cast integral with the bars and the resiliency of the type bars is such that the front end may move upwardly the required distance, even though the rear end be rigidly secured to the standard. Thus, no single type can get out of order or fail to operate, as the strip must come forwardly with the racks, and the weight of the strip is so small that the blow of the hammer readily raises it upwardly and makes the impression.

The hammer mechanism of my improved machine is in some respects, very similar to that disclosed in my previous patent. A series of hammers 105, one for each type bar, are pivoted on a transverse rod 106 and normally held in a position slightly below the type bars by the action of corresponding springs 107. The hammers are drawn down against the action of the springs 107 by a series of hammer-depressing devices 108, each of which is pivoted to a cross rod 109, connecting the ends of two arms 110 and parallel to the rod 106 upon which said arms are pivoted. The depressing devices and the hammers have co-acting projections and recesses substantially as shown in my previous patent, and the depressing devices are tilted to engage with the hammer by tumblers K, similar in construction to those of my previous patent. These tumblers are slidably mounted upon a base plate 111 and are each normally drawn forwardly by a corresponding spring 112. The type bars are provided with depending projections for engaging with the rear ends of the tumblers, so that the latter cannot slide forwardly to engage the hammer-depressing devices with the hammers, unless the type bar be brought forwardly to register a number above zero. The tumblers are so constructed that the operation of any one of them brings into operation the hammer-depressing device corresponding thereto and also all of the hammer-depressing devices corresponding to the type bars of lower denomination.

Each hammer depressor is provided with a forwardly-extending lever arm 114, which when pressed upwardly, serves to release the corresponding hammer and permit it to fly upwardly under the action of a spring and against the under side of the type. The trigger mechanism for engaging with these lever arms 114 is such that the hammers are not released until after the handle 20 has reached its forward position and starts on the return stroke. This trigger mechanism, which is shown particularly in Fig. 4, involves a plate 115, pivoted at its front edge and having its upper surface adapted to engage with the ends of the lever arms 114, to raise the latter and release the hammers. For raising the plate 115, I provide a slide 116 at the side of the machine bearing the handle 20, and this plate carries an upwardly-extending arm 117 which engages with the under side of a pin 118 at the end of the plate 115. The slide 116 is mounted in suitable guides at the upper and lower ends thereof, whereby it may move only in a vertical direction, or one edge of the plate has a spring 119 lying in the path of a projection 120, extending outwardly from the gear wheel 18, and this projection is so disposed and the spring is of such length that when the handle is rotated to the extreme forward position, the projection 120 has slipped past the end of the spring and the latter comes into engagement with the upper side of the projection. Now, as the handle moves in the reverse direction and the gear wheel 18 rotates, the spring 119 and the sliding plate 116 are raised vertically and the plate 115 raises the ends of the lever arms 114 to tilt the hammer depressing devices and to release the hammers, whereupon they swing upwardly into engagement with the type to effect the printing operation. By printing at the beginning of the return stroke rather than at the end of the forward stroke, I positively insure each and all of the type reaching their proper positions before the hammers are released, and I thus insure the correct and accurate printing of the numbers to be added.

For rotating the shaft 106, which carries the arms 110 and the hammer-depressing devices 108, I provide the said shaft with a wheel 121. This wheel has its periphery connected by a chain 122 to the periphery of a wheel 123 mounted on the shaft 17. The shaft 106 is provided with a spring 124 adjacent this wheel, for returning the latter to its original position after the hammers have been released, and I so construct the wheel that after it has been rotated to bring the hammers to their lowermost position, it will remain stationary while the hammers are being released and swinging upwardly into engagement with the type, whereby the arms 110 and the releasing device cannot interfere with the free upward movement of the hammers. For locking the shaft and wheel, I provide the wheel with a peripheral notch 125, which may be engaged with a pivoted plate 126 constituting a dog or pawl. When the parts reach the position indicated in Fig. 4, the pawl engages the notch and locks the wheel against return rotation. The plate 126 is provided with an arm 127 which extends forwardly into the path of the end of the plate 115, so that after the plate has been raised by the slide 116 and the hammers have been released, a further upward movement of the slide will rock the plate 126 and release the wheel and permit the return of the latter to its original position. The plate or pawl 126 is normally held in engagement with the periphery of the wheel by a suitable spring 128.

As previously stated, the ribbon is wound about two rollers 103, having parallel axes and disposed upon opposite sides of the type levers. The ribbon is preferably multi-colored, that is, one-half of the ribbon is treated with an ink of one color and the other half is treated with an ink of a different color, whereby numbers of different character may be printed in different colors. The ribbon and the rollers carrying the same are shiftable longitudinally of the machine, so that either half of the ribbon may be brought to the proper position above the type and between the latter and the paper. For facilitating the shifting of the ribbon, I provide a carriage slidable on the two stationary bars 100 and including two side members 128 disposed on the outer sides of the two bars 100, and these two side members are connected together by transverse bars 129 resting upon the upper edges of the side bars 100 and above the type bars 30. At the front ends of the carriage side members 128, each may be provided with an inwardly-extending flange 130, adapted to rest directly upon the upper edge of the side bars 100 and adapted to engage with the rear edge of the transverse bar 101, to limit the forward movement of the carriage. Depending from the side members 128 in front of the ribbon but back of the guide flange 130, are two bars 131, which have outwardly-extending flanges 132 at their lower ends for supporting the front ends of the axes of the rollers. The rear ends of the axes of the rollers are connected together by a transverse bar 133 having upwardly-extending arms 134. The supporting plates 104 for the ribbon between the rollers are carried by the forward transverse plate 129 of the carriage, so that the ribbon is held above the type and cannot catch thereon during its shifting movement. The carriage is normally held in its forward position by a coil spring 135, the forward end of which is connected to one of the side bars 100 and the rear end of which is connected by a link 136 to the rear end of one of the side members 128 of the carriage. For moving the carriage and ribbon rearwardly when it is desired to print a total, the shaft 48, which is rotated by the depression of the key 46 (see Fig. 5), carries a depending arm 137, the lower end of which has slot-and-pin connections with an extension 138 of one of the side bars 131 of the carriage, so that as the total key 46 is depressed, the arm 137 is swung rearwardly and the entire carriage is forced back against the tension of the spring 135, and the rear section of the ribbon is brought to the printing position.

For automatically transferring the ribbon from one roller to the other during the operation of the machine, so that a new portion of said ribbon will be in operative position each time the carriage is moved, each roller is provided with a ratchet wheel 139. Upon each side of the machine intermediate the ends thereof, are mounted two vertically-reciprocating rods 140, the lower ends of which extend through openings in the bottom of the machine, and the upper ends of which reciprocate within guides 141 rigidly secured to the sides of the casing. Each rod carries intermediate its ends, a dog 142, pivoted to move in a plane transversely of the machine and engaging with the ratchet wheels 139 of the ribbon rollers. Each dog is preferably provided with a spring 142ª for pressing the same toward its corresponding ratchet wheel. Each rod at its lower end carries a roller 143 which rests upon the upper surface of the corresponding side member of the carriage. These side members 12 and 13 have their upper sides cut away in the form of a cam, as shown in dotted lines in Fig. 4, so that as the carriage moves back and forth, the rods 140 are moved upwardly and downwardly. By suitable controlling mechanism hereinafter described, one of the dogs 142 is held out of engagement with its corresponding ratchet wheel and the other dog is permitted to operate, so that each movement of the carriage in the forward direction results in the rotation of one of the wheels 139 and the transference of a portion of the ribbon from the other roller to the one positively rotated.

By means of the governor mechanism, when the ribbon has been transferred from one roller to the other, the engagement of the dogs with the ratchet wheels is reversed, so that said ratchet wheels will rotate in the opposite direction and transfer the ribbon to the empty roller. This governor mechanism includes a plate 144, slidably connected to the transverse bar 133 and having forwardly-extending arms 145 terminating in upwardly-extending plates 146 disposed adjacent to the outer surfaces of the two ribbon rollers. The two plates 146 are so positioned that as the ribbon slowly unwinds from one roller and winds up on the other, the plate 144 is drawn longitudinally in the direction of the roller upon which the ribbon is being rolled. Intermediate the ends of the plate, I provide two notches 147 (see Fig. 2) into either of which may extend the end of a spring 148. The sides of the notches are inclined, and the two notches are adjacent each other, so that as the plate is moved longitudinally, the end of the spring travels up the side of one notch until it reaches the apex of the intermediate projection and then the spring suddenly forces the plate still farther by the action of said spring on the inclined side of the second notch. Pivoted to the transverse bar 133, is a rock lever 149, having pivoted to each end thereof a pawl 150. Each pawl is pivoted at its lower end and is provided with a weighted arm 151, which normally tends to tilt the pawl toward the center of the machine. Secured to the upper end of each pawl is one end of a spring 152, the opposite end of which is in engagement with a rearwardly-extending finger 153 carried by the sliding plate 144. The springs 152 are of such tension that when the plate 144 is in one position, as, for instance, that shown in Fig. 2, one of said springs, that is, the right-hand one, will be under sufficient compression to counteract the weighted arm 151 and hold the pawl in operative position; while the tension of the other spring 152, that is, the left-hand one, will be insufficient to counteract the weighted arm 151 and the pawl will swing to inoperative position.

The vertically-movable rods or bars 140, which are reciprocated by the movement of the carriage, as previously described, carry ratchets 154, which engage with the pawls 150 when the latter are in operative position. Thus, with all of the parts in the position indicated in Fig. 2, the ribbon will be slowly accumulated on the left-hand roller until the ribbon contacts with the corresponding plate 146 to shift the plate 144 toward the left-hand side. When said plate has traveled half way, the engagement of the spring 148 with the inclined side of the second notch will force the plate the remainder of the distance and this will increase the tension of the left-hand spring 152 sufficiently to throw the left-hand pawl 150 into engagement with the left-hand ratchet wheel 154, and the releasing of the tension on the right-hand spring 152 will permit the right-hand pawl to swing out of the path of the right-hand ratchet 154. Now, the continual reciprocation of the rods 140 during the working of the machine will operate to lift the left-hand end of the lever 149 until the pin 155 carried thereby engages with the ratchet 142 to swing the latter out of engagement with the left-hand ratchet wheel 139 and the right-hand pin 155 will come out of engagement with the right-hand ratchet 142 and the latter will begin operations upon the right-hand ratchet wheel 139 to draw the ribbon in the opposite direction. The parts will remain in this position until the accumulation of ribbon on the right-hand roller causes the plate 144 to shift in the reverse direction.

The rods 140 which operate to rotate the ribbon rollers and to tilt the lever 149, also operate to rotate the platen over which the paper passes. The platen 99 is mounted on a shaft 156, which latter has rollers 157 extending down into the casing of the machine. Directly beneath these rollers are two friction wheels 158, each having a ratchet portion, and for rotating these ratchet friction wheels, I provide two pawls 159, each pivoted at its lower end to the corresponding rod 140. Thus, each time the carriage is brought forward and returned again, the paper has advanced one space.

When it is desired to begin the listing and adding of a series of numbers, it is, of course, customary to clear the machine, so that all of the numeral wheels will stand at zero position, but it is also desirable that there be some indication on the printing slip that the machine was cleared before the beginning of the listing operation. In my present construction, I accomplish this by providing means for printing a zero in the units and in the tens columns if the total key be depressed when all of the numerals stand at zero. This means includes a lever 160 (see Fig. 2) pivoted intermediate its ends to one of the side bars 100 and having its lower end inwardly-extending and disposed beneath the tumblers K and adjacent the ends of two of the hammer-depressing devices 108. The upper end of the lever extends into the path of a hook 161, carried by one of the side bars 128 of the ribbon-shifting carriage, so that with all of the numeral wheels in the zero position, if the total key be depressed and the handle 20 be operated, the hook 161 will engage with the upper end of the lever 160, to lock the latter and swing the lower end thereof forwardly to tilt two of the hammer-depressing devices 108, and the hammers in the units and tens columns will be depressed and released to print two red zeros. This will indicate to any one inspecting the slip that all of the numeral wheels stood at zero at the beginning of the operation.

Having thus described my invention, I claim as new and desire to secure Letters Patent:

1. In a calculating machine, a carriage movable forwardly at the beginning of each operation, an oscillating shaft, an arm depending therefrom, a link connecting said arm and said carriage, a gear wheel on said shaft, a second gear wheel in mesh therewith, and a handle connected to said last-mentioned gear wheel and movable toward the front end of the machine to force the carriage toward the forward end.

2. In a calculating machine, a carriage movable forwardly at the beginning of each operation, an oscillating shaft, an arm depending therefrom, a link connecting said arm and said carriage, a gear wheel on said shaft, a second gear wheel in mesh therewith, a handle connected to said last-mentioned gear wheel and movable toward the front end of the machine to force the carriage toward the forward end, and a spring for returning said carriage to its original position upon the release of the handle.

3. In a calculating machine, a carriage, a rock shaft, an arm carried by said rock shaft, a link connecting said arm and said carriage, a gear wheel on said rock shaft, a second gear wheel in mesh therewith, a handle secured to said second-mentioned gear wheel and movable toward the front end of the machine to force the carriage toward the forward end of the machine, a spring for returning the carriage upon the release of the handle, and a check device for limiting the speed of the return movement.

4. In a calculating machine, the combination of a series of numeral wheels, each having a series of recesses in one edge thereof, means for varying the elevation of said wheels, means for rotating said wheels when in either their raised or lowered position, and locking means for preventing the rotation of said wheels when in their intermediate position, said locking means comprising a longitudinally-movable plate having depending fingers for engagement within the notches of said wheels.

5. In a calculating machine, a series of numeral wheels, each having a series of notches in one edge thereof, a longitudinally-movable plate having a series of fingers in engagement with said notches for locking the wheels against rotation, and an arm having engagement with said plate for moving the same longitudinally to bring said fingers into or out of operative position.

6. In a calculating machine, the combination of a series of numeral wheels, a longitudinally-movable plate disposed adjacent thereto and having a series of fingers for engagement with said wheels, said plate having a pair of operatively-disposed cams at one end thereof, and a longitudinally-movable arm having engagement with said cams, whereby the continued movement of said arm in one direction moves said plate and its fingers into and out of operative engagement.

7. In an adding and listing machine, the combination of total-accumulating mechanism, and printing mechanism, said printing mechanism including a series of type bars and a series of hammers for engagement therewith, each of said type bars being formed of a single integral flexible strip of metal and presenting a series of upwardly-facing types and having one end free and unattached.

8. An adding and listing machine, comprising, in combination, a series of numeral wheels, a series of rack bars, longitudinally movable in one direction to rotate said numeral wheels and accumulate a total, a series of type bars longitudinally movable with said rack bars, a carriage movable forwardly to permit the movement of said rack bars and type bars and movable rearwardly to return the same to their original position, and a series of hammers for engagement with said type bars during the return movement of the carriage.

9. In an adding and listing machine, the combination of a series of numeral wheels, a series of rack bars movable longitudinally in one direction to rotate said numeral wheels and accumulate a total, a series of type bars movable with said rack bars, operating mechanism for reciprocating said rack bars and type bars, hammers for engagement with said type bars, and means for liberating said hammers to permit their operation at the beginning of the return movement of said operating mechanism.

10. An adding and listing machine, comprising, in combination, accumulating mechanism, printing mechanism, a movable carriage for controlling both of said mechanisms, said accumulating mechanism being operated during the movement of the carriage in one direction and said controlling mechanism being operated during the movement of the carriage in the opposite direction, means for interrupting the operation of the accumulating mechanism, and means for causing items, during said interruption, to be recorded in an ink of different color from that in which items are recorded at other times.

11. An adding and listing machine, including a plurality of longitudinally-movable type bars, a plurality of pivoted hammers mounted beneath the same, a hammer-depressing device for each of said hammers, an operating carriage movable in one direction to depress said hammers and said devices, and means for releasing said hammers during the return movement of said carriage.

12. In an adding and listing machine, the combination of a series of longitudinally-movable type bars, a rock shaft, a series of hammers pivoted thereto, a series of hammer-depressing devices, an operating carriage, means for rotating said rock shaft by the movement of the carriage in one direction, and releasing mechanism for engagement with said depressing devices and operating during the movement of the carriage in the reverse direction.

13. An adding and listing machine, including a series of type bars, a series of pivotally-mounted hammers for engagement therewith, a series of hammer-depressing devices, a pivoted plate for engagement with said depressing devices to move them to inoperative position, a longitudinal slide for oscillating said plate, a main shaft, and means for lifting said slide during the rotation of the main shaft in one direction.

14. An adding and listing machine, comprising, in combination, a series of longitudinally-movable type bars, a rock shaft, a series of hammers pivoted thereto, a series of hammer-depressing devices, means for rotating said rock shaft in one direction to depress said hammers and said devices, means for releasing said devices to permit the return movement of the hammers, and means for later releasing the rock shaft to permit its return to its original position.

In testimony whereof I have signed my name to this specification in the presence of two subscribing witnesses.

CARL L. NELSON.

Witnesses:
CLAIR W. FAIRBANK,
JOHN P. DAVIS.